United States Patent [19]

Mortimer

[11] 4,210,370
[45] Jul. 1, 1980

[54] ANTI-SKID VEHICLE BRAKING SYSTEMS

[75] Inventor: Ivan Mortimer, Solihull, England

[73] Assignee: Girling Limited, Birmingham, England

[21] Appl. No.: 955,536

[22] Filed: Oct. 30, 1978

[30] Foreign Application Priority Data

Nov. 12, 1977 [GB] United Kingdom ............... 47184/77

[51] Int. Cl.² ............................................... B60T 8/02
[52] U.S. Cl. ...................................... 303/118; 303/119
[58] Field of Search ........................ 303/40, 64, 70, 74, 303/80, 113, 118, 119

[56] References Cited

U.S. PATENT DOCUMENTS

| 3,823,987 | 7/1974 | Kurichh | 303/118 |
| 3,902,764 | 9/1975 | Sebo | 303/118 |
| 3,929,383 | 12/1975 | Urban et al. | 303/118 |
| 3,950,035 | 4/1976 | Tribe | 303/118 |

FOREIGN PATENT DOCUMENTS

2755814  6/1978  Fed. Rep. of Germany ............ 303/118

*Primary Examiner*—Douglas C. Butler

*Attorney, Agent, or Firm*—Scrivener, Parker, Scrivener and Clarke

[57] ABSTRACT

In a fluid-pressure operated anti-skid braking system operation of a brake applying relay valve is controlled by application pressure in an application chamber. A memory chamber is connected to the application chamber through a one-way valve and a restrictor permits pressure in the memory chamber to decay into the application chamber when the pressure in the application chamber reduces at a skid point. Application pressure is supplied to the application chamber through a normally open latch valve. Re-application of the brakes following a skid is controlled by closure of the latch valve which permits only a restricted flow of application pressure into the application chamber. This is sufficient to re-apply the brakes rapidly in a first stage until the pressure in the application chamber becomes equal to that of the decayed pressure in the memory chamber. Brake-application then continues at a slower rate in a second stage since the restricted flow of control pressure has also to increase the pressure in the memory chamber. This continues until the latch valve re-opens so that the brakes are re-applied in a third stage at an original application pressure.

9 Claims, 8 Drawing Figures

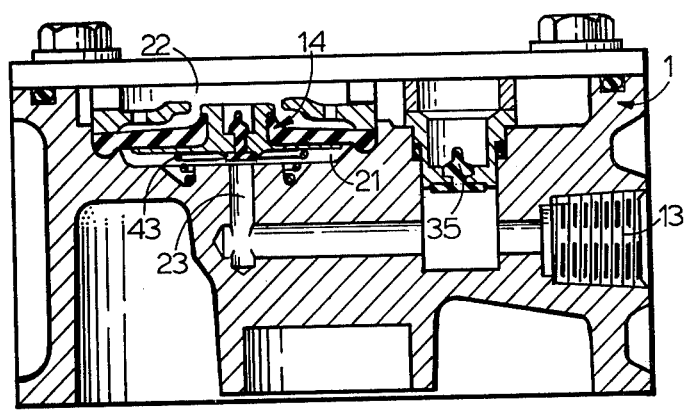
FIG. 6.
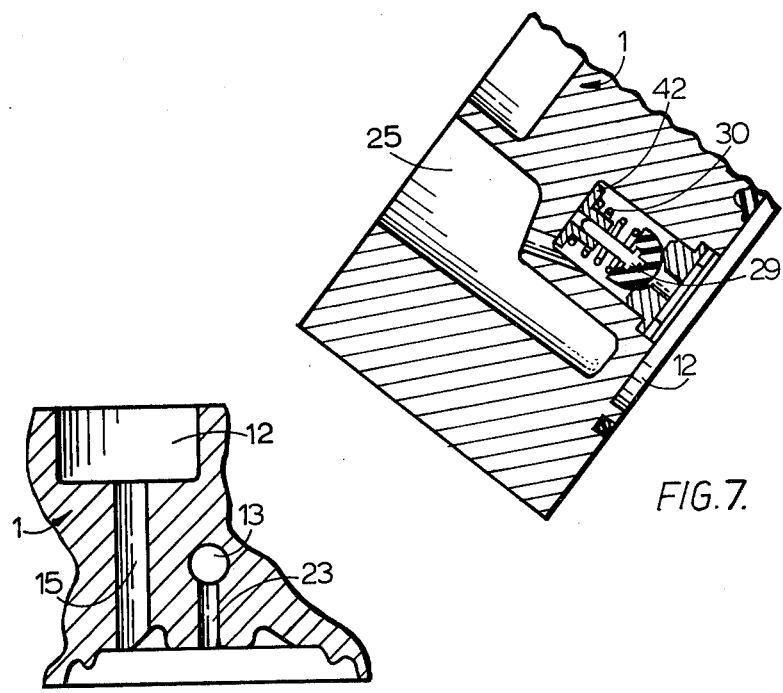
FIG. 7.
FIG. 8.

ANTI-SKID VEHICLE BRAKING SYSTEMS

SPECIFIC DESCRIPTION

This invention relates to improvements in fluid-pressure operated anti-skid systems for vehicles of the kind in which operating fluid from a supply for actuating a wheel brake is supplied to the brake through fluid-flow control valve means interposed in the line between the supply and the brake, and means responsive to a skid signal are incorporated for operating the valve means to relieve the brake pressure of the fluid supplied to the brake at a skid point, a memory chamber being incorporated for storing a memory pressure dependent upon the brake pressure occurring at the skid point to provide a datum or changeover point between first and second successive stages of brake re-application, the first stage comprising the re-application of the operating fluid from the supply until an intermediate pressure less than the pressure at the skid point is attained at the changeover point, and the second stage comprising the continued re-application of the supply of operating fluid at a reduced rate of pressure increase.

In known fluid-pressure operated anti-skid braking systems of the kind set forth slow re-application of the supply of operating fluid at the reduced rate of pressure increase will continue throughout the remainder of the brake re-application in a common cycle following a skid condition, until the end of the cycle, or until a further skid condition is reached. The value of re-application of the supply at the reduced rate is limited by the requirement that, to be fully effective, an anti-skid system must react quickly to changes in surface conditions. It follows that if the surface friction level increases during a brake re-application following a skid condition then with a very slow re-application rate the pressure will take a considerable time to reach a new value compatible with the surface conditions. Adhesion utilisation will therefore be low during this period. Although a relatively low rate of re-application at the reduced rate of pressure increase is ideal in fixed surface conditions, where the surface condition improves a higher value is required to take advantage of the change.

According to our invention in a fluid-pressure operated anti-skid braking system of the kind set forth the fluid flow control valve means is operated by application pressure in an application chamber which pressure is reduced at the skid point by the means responsive to the skid signal, and the application chamber communicates with the memory chamber through a first one-way valve and through a first restrictor, application pressure from an inlet port being supplied to the application chamber through a normally open latch valve and also through a by-pass passage which by-passes the latch valve and incorporates a second restrictor, the latch valve being adapted to close in response to a decrease in pressure in the application chamber caused by the means responsive to the skid signal so that the first and second successive stages of brake re-application depend upon the pressure in the application chamber being increased by the application pressure supplied only through the by-pass passage until that pressure attains a value not exceeding the value of the application pressure which existed at the previous skid point and which is sufficient to cause the latch valve to open whereafter the application pressure at the inlet port can again be supplied to the application chamber through the latch valve to enable the pressure in the application chamber to be increased at an increased rate whereby brake re-application continues in a third stage continuous with the second but at a higher rate of pressure increase.

Preferably the latch valve comprises an valve member dividing a space into first and second compartments and a seating with which the valve member is adapted to co-operate to cut-off communication from the inlet port to the first compartment, the application chamber being connected to the first compartment, and one of the chambers being connected to the second compartment through a second one-way valve which prevents flow from the second compartment into the said one chamber.

The provision of the third stage enables us to take advantage rapidly of any local improvement in the surface conditions.

When the skid signal is operative only for a short period of time the second stage of re-application will be relatively short. This is because the pressure in the memory chamber, which is replenished from the application chamber in the second stage, can decay or be reduced only by a small amount by leakage into the application chamber through the first restrictor.

When the skid signal is operative for a substantial period of time, the second stage of re-application will be longer but can be reduced to a predetermined period of time by careful selection of the load of a spring acting to bias a third one-way valve into a closed position to prevent flow from the memory chamber back into the second compartment of the latch valve. Conveniently this can be achieved by selecting the load of the spring so that the third one-way valve can open to allow flow from the latch valve into the memory chamber only when the difference between the pressure holding the latch valve closed and the pressure in the memory chamber attains a predetermined value. Thereafter the pressure holding the latch valve closed reduces at the same rate as the rate of decay of the pressure in the memory chamber and a relatively smaller pressure is then required to open the latch valve to initiate the third stage.

It follows therefore that the third re-application stage is initiated when either the application pressure attains a value which existed at the previous skid point, or the effect upon the latch valve of the decay of pressure in the memory chamber has reduced the amount by which the pressure in the application chamber must rise to open the latch valve, which ever occurs first.

Some embodiments of our invention are illustrated in the accompanying drawings in which:

FIG. 6 is a section on the line 6—6 of FIG. 5;

FIG. 7 is a section on the line 7—7 of FIG. 4; and

FIG. 8 is a section on the line 8—8 of FIG. 4.

Figure 1:
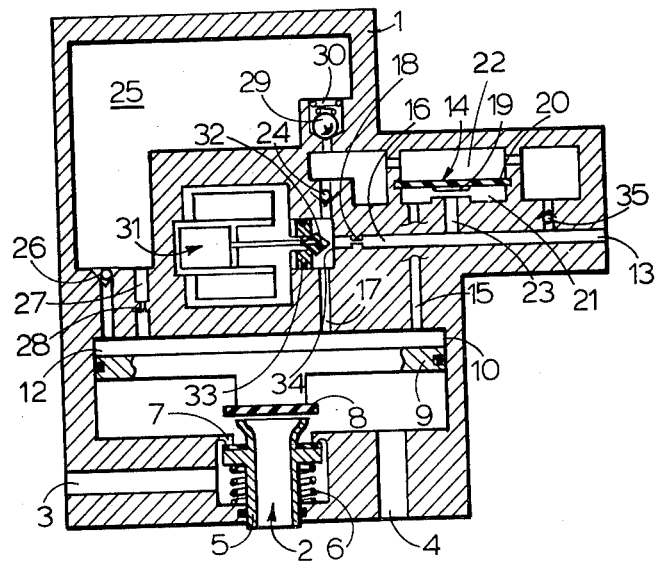
FIG. 1 is a section through a schematic version of a fluid-flow control valve assembly for a pneumatic skid braking system.

The control valve assembly illustrated in FIG. 1 of the drawings comprises a housing 1 incorporating a relay valve 2 for controlling communication between an inlet port 3 for connection to a reservoir for pressure fluid, conveniently a source of air under pressure, and an outlet port 4 for connection to brake actuators. The relay valve 2 comprises a hollow valve member 5 which is normally urged by a spring 6 into engagement with a seating 7 to isolate the port 3 from the port 4. A valve head 8 carried by a piston 9 which works in a bore 10 in the housing 1 is spaced from the inner end of the valve member 5 to exhaust the port 4 to atmosphere through the hollow valve member 5 itself.

To apply the brake the piston 9 is moved in the bore, initially to cause the head 8 to engage with the valve member 5 to isolate the brakes from exhaust and thereafter to move the valve member 5 away from the seating 7 so that fluid from the source is supplied to the port 4 from the inlet port 3, and the brake actuators are operated.

Operation of the relay valve 2 is controlled by an application pressure in an application chamber 12 in the bore 10 above the piston 9. The application pressure is supplied to the application chamber 12 for example from a treadle valve, through an inlet port 13. The inlet port 13 leads into the chamber 12 through a latch valve 14 and an outlet passage 15 and through a by-pass passage 16 which by-passes the latch valve 14 and communicates with the application chamber 12 through a passage 17. A restrictor 18 is provided in the by-pass passage 16.

The latch valve 14 comprises a valve head 19 carried by a flexible diaphragm 20 to constitute an imperforate valve member which divides a space into first and second compartments 21 and 22, respectively. The head 19 is normally spaced from a seating surrounding a passage 23 which leads into the compartment 21 with which the chamber 12 is in communication through the outlet passage 15. A one-way valve 24 permits fluid to flow from the passage 17 into the compartment 22 but prevents flow in the opposite direction.

The pressure in the application chamber 12 is sensed by a memory chamber 25 with which the application chamber 12 is in communication through a one-way valve 26 and a passage 27 provided with a restrictor 28.

A second one-way valve 29 which is biassed into a closed position by a spring 30 permits fluid to flow from the compartment 22 into the memory chamber 25 when the pressure in the compartment 22 exceeds that in the memory chamber 25 by a predetermined value, determined by the load of the spring 30.

A solenoid-operated valve 31 comprises a solenoid operated valve member 32 which is alternatively engageable with a pair of spaced seatings 33 and 34. The seating 33 surrounds an exhaust port (not shown) and the seating 34 is located in the passage 16 downstream of the restrictor 18. The solenoid is energised by a control system responsive to deceleration of a wheel braked by a brake applied from the port 4 and, normally, the solenoid is de-energised so that the valve member 32 engages with the seating 33 to close the exhaust port.

When the control valve assembly is operated to apply the brakes normally, the solenoid is de-energised and the latch valve 14 is open with the head 19 spaced from the seating which surrounds the passage 23. Pressure fluid from the treadle valve is supplied to the application chamber 12 through the passages 23, the latch valve 14 and the passage 15 to operate the relay valve 2 as described above. To a lesser extent it is also supplied through the restrictor 18. In addition the compartment 22 and the memory chamber 25 are both subjected to equal pressures equal to that in the application chamber 12 by communication through the passage 17 and the one-way valve 24; and through the one-way valve 26 and the restrictor 28, respectively. The pressures in the application chamber 12, the memory chamber 25 and the compartment 22 all rise at the same rate, with the relay valve 2 opening further to increase the brake applying pressure. When the treadle valve is released the application chamber 12 is exhausted to atmosphere by the treadle valve, and the compartment 22 is similarly exhausted, through a one-way valve 35. Finally, the pressure in the memory chamber 25 decays through the restrictor 28 to the application chamber from which it is exhausted.

Should the deceleration of a braked wheel, which is sensed by the control system, exceed a predetermined value, the solenoid is energised to urge the valve member 32 in a direction to expose the exhaust port surrounded by the seating 33 and engage with the seating 34 to cut-off the supply of fluid from the treadle valve through the restrictor 18.

Figure 2:
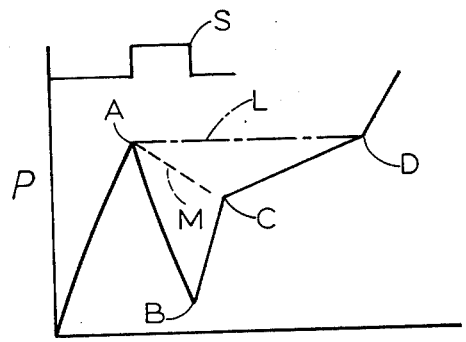
FIG. 2 is a graph of brake-pressure application and re-application including rapid skid correction.

In the graph of FIG. 2 pressure P is plotted against time T. The lower plot shows the braking pressure produced when the solenoid indicated by S is energised or de-energised as shown in the upper plot.

The skid point is indicated by A in FIG. 2 and when the solenoid is energised as described above, the pressure in the application chamber 12 is exhausted to atmosphere so that the piston 9 rises, initially to cut-off communication between the port 3 and the port 4, and subsequently exhaust the brake pressure to correct the skid.

Reduction in the pressure in the application chamber 12 reduces the pressure in the compartment 21 so that the latch valve 14 closes. Pressure is trapped in the compartment 22 since both the passage 13 and, initially, the chamber 25 are still at the application pressure selected by the driver by operation of the treadle valve. Hence the valves 29 and 35 will not open.

When the pressure applied to the brakes is reduced by an amount sufficient to correct the skid, as shown at point B the solenoid is de-energised with the valve member 32 re-engaging with the seating 33. Thereafter, the pressure from the port 13 is re-applied automatically to the application chamber 12 but only at a reduced rate through the restrictor 18, since the latch valve 14 is closed. However, since the application chamber 12 is of relatively small volume the brakes are re-applied rapidly during a first stage until a changeover point C is reached. At the point C the pressure in the application chamber 12 is equal to that of the pressure then present in the memory chamber 25 which has decreased as shown in a dotted line M from the pressure at the skid point A by an amount dependent upon the size of the restrictor 28 and the time taken to correct the skid. Thereafter, the pressure fluid from the treadle valve has also to increase the pressure in the memory chamber 25 through the one-way valve 26 at the same time as it increases the pressure in the application chamber 12.

Since the volume of the application chamber 12 is small in comparison with that of the memory chamber 25, the pressure in the application chamber 12, and hence the pressure applied to the brakes under the control of the relay valve 2, will increase at a lower rate in a second stage up to a point D at which the pressure in the application chamber 12 is equal to that which existed in the application chamber 12 at the skid point. This is shown by chain-dotted line L. This pressure was trapped in the compartment 22 when the latch valve 14 closed and therefore when that pressure is attained the pressures on opposite sides of the diaphragm 20 are equalised so that the latch valve 14 opens. Pressure from the treadle valve can then be applied to the application chamber 12 through the open latch valve 14 and the unrestricted passages 23 and 15. The pressure applied to the brakes can therefore increase at an increased rate in a third stage from the point D.

If the pressure in the memory chamber 25 has decayed by less than a predetermined amount, say 20 psi, when the skid correction occurs, the re-application sequence is as described above with the duration of the second stage from C to D being relatively short. However, when the solenoid is energised for a substantial period of time before the skid is corrected, the first stage from B to C will be relatively short and the second stage from C to D correspondingly longer, which may be undesirable for the reasons explained above. Thus, the load of the spring 30 is chosen so that the one-way valve 29 can open to reduce the pressure in the compartment 22 when the pressure in the memory chamber 25 has decayed by an amount greater than the predetermined value. This means that upon automatic brake re-application following skid correction, the second stage is of limited duration since a relatively smaller pressure in the application chamber 12 is required to open the latch valve 2 and initiate the third stage after point D at an increased rate of pressure increase. For example, if the maximum pressure difference between the memory chamber 25 and the compartment 22 is 20 psi (set by the load of the spring 30) then because the pressure in compartment 21 is substantially the same as that in the application chamber 12, and because during the second stage the pressure in the memory chamber 25 is rising with and equal to the pressure in the application chamber 12, then the pressure in the application chamber 12 has only to be increased by that amount during the second stage. If the re-application rate is fixed at say 40 psi/sec by the restrictor 18, then the maximum period of time for the second stage is limited to 20 psi divided by 40 psi/sec which equals 0.5 seconds.

Figure 3:
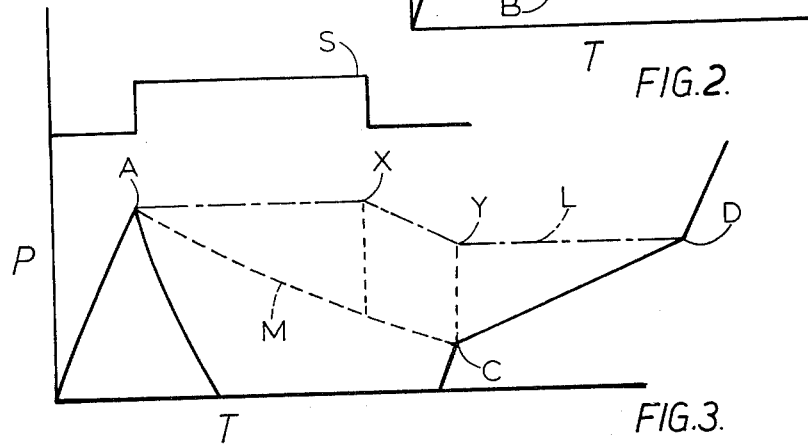
FIG. 3 is a graph similar to FIG. 2 but showing the characteristics of a slow skid correction.
Figure 4:
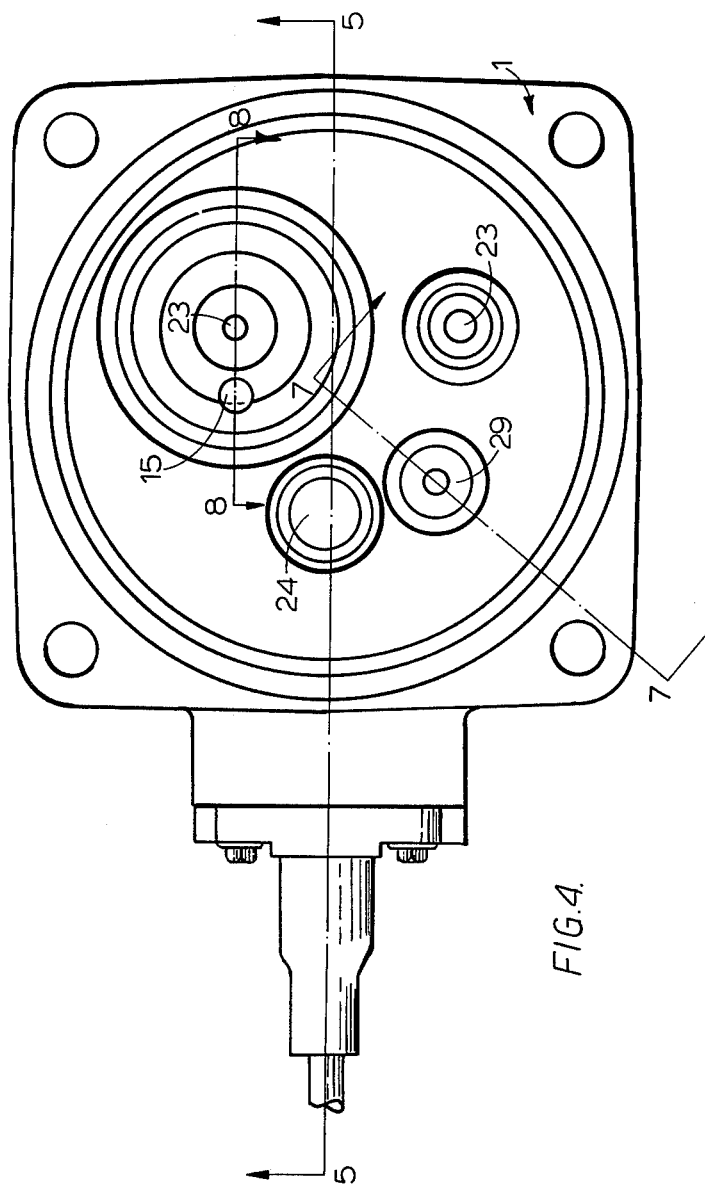
FIG. 4 is a plan of a practical version of the control valve assembly illustrated in FIG. 1, with a top cover plate removed for clarity.
Figure 5:
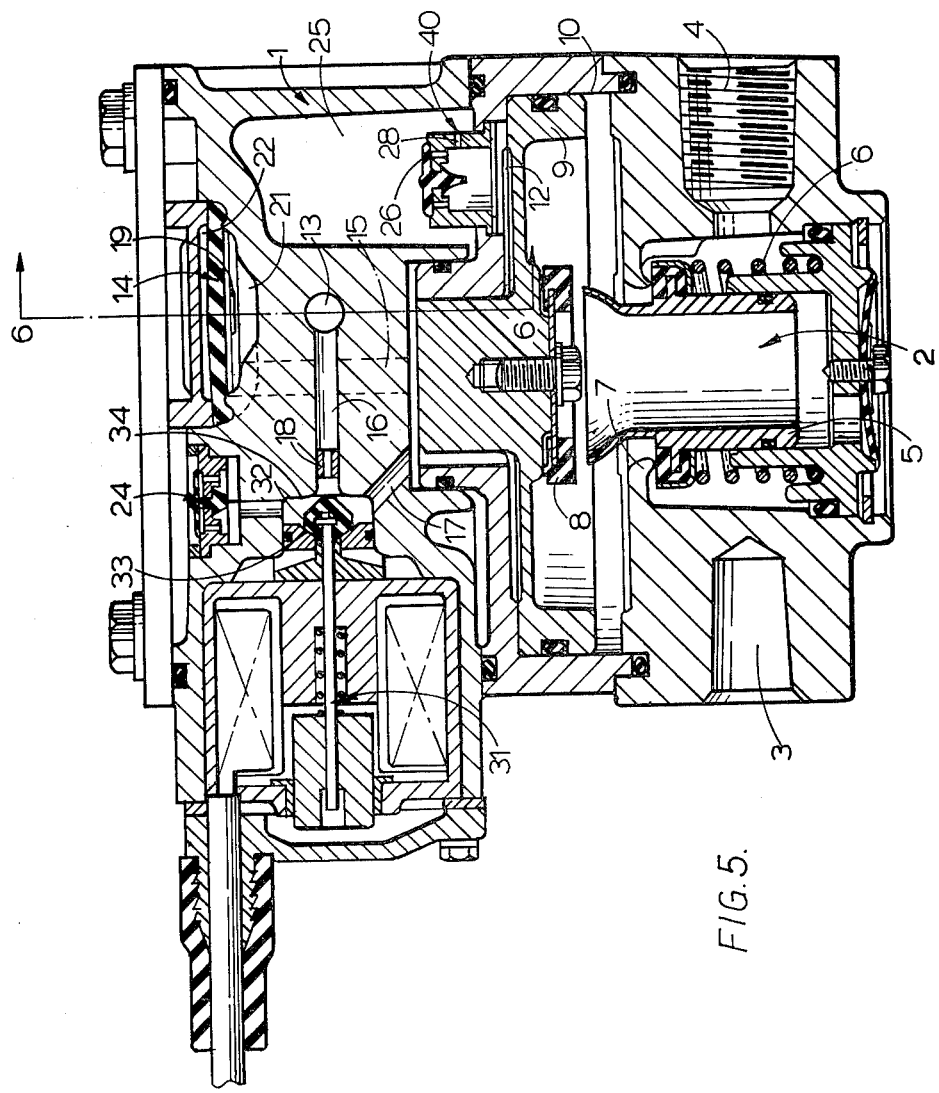
FIG. 5 is a section through the control valve assembly on the line 5—5 of FIG. 4.

FIG. 3 is similar to FIG. 2 and shows the characteristics of a re-application sequence responsive to a long skid signal and points corresponding to A, C and D in FIG. 2 have been applied to corresponding points. The changeover point C is as before determined by the decay of pressure from the chamber 25 through the restrictor 28.

From the characteristics of the latch valve 14 shown by the chain-dotted line it will be seen that the one-way valve 29 opens at point X to reduce the pressure in the chamber 22 at the same rate as the rate of decay of pressure in the memory chamber 25. A relatively smaller pressure is then required in the chamber 21 to open the latch valve 14. The interval C D is constant in situations where the decay of pressure in the memory chamber 25 exceeds the said predetermined value, and is determined by the load of the spring 30.

In a practical construction of valve assembly illustrated in FIGS. 4 to 8 the one-way valve 26 and the restrictor 28 are combined in a single assembly 40, the one-way valve 29 comprises a headed stem 41 which is guided to slide in a flanged guide 42 which also provides an abutment for the spring 30, and the head 19 of the latch valve 14 is biassed away from the seating surrounding the passage 23 by means of a light bias spring 43.

Although the arrangement of the valve assembly of FIGS. 4 to 8 is in some respects different from that of FIG. 1, nevertheless the construction and operation is otherwise the same and corresponding reference numerals have been applied to corresponding parts.

I claim:

1. A fluid-pressure operated anti-skid system for vehicles comprising a wheel brake, a supply of operating fluid for actuating said wheel brake, fluid-flow control valve means through which operating fluid from said supply is supplied to said wheel brake, means responsive to a skid signal for operating said valve means to relieve pressure of said operating fluid at a skid point, means defining a memory chamber for storing a memory pressure dependent upon said pressure of said operating fluid at said skid point to provide a first changeover point between first and second stages of brake re-application, said first stage comprising the re-application of said operating fluid from said supply until an intermediate pressure less than the pressure at said skid point is attained at said first changeover point, and said second stage comprising the continued re-application of said supply of operating fluid at a reduced rate of pressure increase, means defining an application chamber for operating said fluid-flow control means, a supply of application pressure for said application chamber of which said pressure is reduced at said skid point by said means responsive to said skid signal, an inlet port from which said application pressure is supplied to said application chamber, a first one-way valve providing communication between said application chamber and said memory chamber, a first restrictor providing communication between said application chamber and said memory chamber in both directions, a latch valve disposed between said inlet port and said application chamber, a by-pass passage between said inlet port and said application chamber and by-passing said latch valve, a second restrictor in said by-pass passage, said latch valve being normally open but being adapted to be moved into a closed position in response to a decrease in pressure in said application chamber caused by said means responsive to said skid signal whereby said first and second successive stages of brake re-application depend upon said pressure in the application chamber being increased by said application pressure supplied only through said by-pass passage and said second restrictor until that pressure attains a value at a second changeover point, means for holding said latch valve in said closed position comprising a fluid pressure dependent upon pressure existing in said application chamber at said skid point, and means responsive to pressure in said application chamber at said second changeover point to cause said latch valve to open whereafter said application pressure at said inlet port can again be supplied to said application chamber through said latch valve to enable the pressure in said application chamber to be increased at an increased rate whereby brake re-application continues in a third stage continuous with said second but at a higher rate of pressure increase.

2. A fluid-pressure operated anti-skid braking system as claimed in claim 1, wherein said latch valve comprises a valve member dividing a space into first and second compartments, and a seating with which said valve member is adapted to co-operate to cut-off communication from said inlet port to said first compartment, a first connection is provided between said application chamber and said first compartment, a second connection is provided between one of said chambers and said second compartment, and a second one-way valve is provided to prevent flow from said second compartment into the said one chamber, the valve member being operative to close the latch valve when the pressure in said first compartment is reduced relative to that in said second compartment at said skid point, and said valve member being operative to re-open said latch valve and place said inlet port in communication with said application chamber when the pressure in the said one chamber has increased to a value sufficient to overcome the closing effect of pressure trapped in said second compartment by said second one-way valve.

3. A fluid-pressure operated anti-skid braking system as claimed in claim 2, wherein said valve member is engageable directly with said seating.

4. A fluid-pressure operated anti-skid braking system as claimed in claim 2, wherein said second compartment is connected to said application chamber through said second one-way valve.

5. A fluid-pressure operated anti-skid braking system as claimed in claim 3, wherein said valve member is imperforate and said second one-way valve is located in a passage which connects said application chamber to said second compartment.

6. A fluid-pressure operated anti-skid braking system as claimed in claim 2, wherein a third one-way valve is connected between said memory chamber and said second compartment to prevent flow from said memory chamber into said latch valve, and a spring is provided for biassing said third one-way valve into a closed position, the load of said spring being so selected that said third one-way valve can only open to allow flow from said second compartment into said memory chamber when the difference between the pressure holding said latch valve closed and the pressure in said memory chamber attains a predetermined value.

7. A fluid-pressure operated anti-skid braking system as claimed in claim 1, wherein the volume of said application chamber is relatively small in comparison with that of said memory chamber.

8. A fluid-pressure operated anti-skid system for vehicles comprising a wheel brake, a supply of operating fluid for actuating said wheel brake, fluid-flow control valve means through which operating fluid from said supply is supplied to said wheel brake, means responsive to a skid signal for operating said valve means to relieve pressure of said operating fluid at a skid point, means defining a memory chamber for storing a memory pressure dependent upon said pressure of said operating fluid at said skid point to provide a first changeover point between first and second stages of brake re-application, said first stage comprising the re-application of said operating fluid from said supply until an intermediate pressure less than the pressure at said skid point is attained at said first changeover point, and said second stage comprising the continued re-application of said supply of operating fluid at a reduced rate of pressure increase, means defining an application chamber for operating said fluid-flow control means, a supply of application pressure for said application chamber of which said pressure is reduced at said skid point by said means responsive to said skid signal, an inlet port from which said application pressure is supplied to said application chamber, a first one-way valve providing communication between said application chamber and said memory chamber, a first restrictor providing communication between said application chamber and said memory chamber in both directions, a latch valve disposed between said inlet port and said application chamber, said latch valve comprising a valve member dividing a space into first and second compartments, and a seating with which said valve member is adapted to co-operate to cut-off communication from said inlet port to said first compartment, a first connection between said application chamber and said first compartment, a second connection between one of said chambers and said second compartment to urge said valve member into engagement with said seating thereby urging said latch valve into a closed position and holding said latch valve in said closed position upon a reduction at said skid point of pressure in said first compartment which is responsive to a decrease in pressure in said application chamber caused by said means responsive to said skid signal whereby said first and second successive stages of brake re-application depend upon said pressure in the application chamber being increased other than through said latch valve until that pressure attains a predetermined value at a second changeover point, and means responsive to pressure in said application chamber at said second changeover point to cause the pressure in said first compartment to increase and overcome that in said second compartment whereby said valve member can move away from said seating whereafter said application pressure at said inlet port can again be supplied to said application chamber through said latch valve to enable the pressure in said application chamber to be increased at an increased rate whereby brake re-application continues in a third stage continuous with said second but at a higher rate of pressure increase.

9. A fluid-pressure operated anti-skid system as claimed in claim 8, wherein said application chamber is connected to said second compartment through said second connection.

* * * * *